_United States Patent Office_ 3,093,684
Patented June 11, 1963

3,093,684
NOVEL N(2-HYDROXY-B-TRIHALOETHYL) DERIVATIVES OF TETRACYCLINES
Alfons Söder, Bad-Soden, Taunus, and Walter Siedel, Frankfurt am Main, Germany, assignors to Farbwerke Hoechst Aktiengesellschaft vormals Meister Lucius & Bruning, Frankfurt am Main, Germany, a corporation of Germany
No Drawing. Filed Feb. 8, 1961, Ser. No. 87,738
Claims priority, application Germany Feb. 10, 1960
10 Claims. (Cl. 260—559)

The present invention relates to new condensation products of tetracyclines, particularly condensation products of tetracyclines, their isomers, anhydro compounds and derivatives with an unchanged acid amide group at the one side and a perhalogenated compound at the other.

By reacting the tetracyclines with formaldehyde and primary or secondary amines the corresponding aminomethyltetracyclines are obtained which are disclosed in detail by Serial No. 686,297, now abandoned. By said reaction it was possible considerably to increase the desired water-solubility of the tetracycline antibiotics for injection preparations. In the physiological pH-range the water-solubility of tetracycline amounts to 0.5 milligram per cc., that of pyrrolidino-methyltetracycline to 1500 milligrams per cc. On the other hand, in order to attain certain therapeutic effects it is desirable to increase the solubility of the tetracyclines in lipoids.

Now, we have found that by reacting perhalogenated acetaldehydes, for instance chloral, bromal or fluoral, with tetracyclines, their isomers, anhydro compounds and derivatives containing an unchanged acid amide group, condensation products are obtained which differ from the starting substances by their physical and chemical properties and, due to their favorable resorption properties, are well suitable for certain galenic preparations, for instance depository preparations. They can likewise be used as feed supplements.

Tetracyclines that can be subjected to condensation are, for instance, tetracycline, 5-hydroxytetracycline, 7-chlorotetracycline, 7-bromotetracycline, the corresponding 6-desmethyl-, 4-desdimethyl-amino-, 12a-desoxy-, 6-desoxy, 5a(11a)-dehydro-, epi- and anhydro compounds as well as tetracyclines carrying a quarternary amino group in 4-position.

The tetracyclines are reacted as such or in the form of their basic salts in an inert, anhydrous solvent, for instance in chlorinated hydrocarbons, pyridine, dimethylsulfoxide or dimethyl formamide, preferably containing 1–3 mols of perhalogenated acetaldehyde at temperatures between 0 and +60° C., preferably at +20 to +40° C.

The condensation products may be obtained in the usual manner in the form of their physiologically tolerated basic salts.

The desired condensation products can be isolated according to known methods. Their very low solubility in dilute aqueous hydrochloric acid allows of easily separating off non-reacted starting substances. Chromatographic methods may likewise be applied in order to purify the condensation products. The afore-mentioned purification methods can, however, be generally dispensed with, if an excess amount of perhalogenated acetaldehyde is used and a quantitative condensation is guaranteed by chromatographic control.

TABLE 1
$R_F$ Values of the Tetracycline Condensation Products

| | |
|---|---|
| N-(α-hydroxy-β-trichloroethyl)-tetracycline | 0.44 |
| N-(α-hydroxy-β-trichloroethyl)-4-epitetracycline | 0.30 |
| N-(α-hydroxy-β-trichloroethyl)-7-chlorotetracycline | 0.67 |
| N-(α-hydroxy-β-trichloroethyl)-7-chloro-4-epitetracycline | 0.51 |
| N-(α-hydroxy-β-trichloroethyl)-5-hydroxy-tetracycline | 0.57 |
| N-(α-hydroxy-β-trichloroethyl)-7-chloro-6-desmethyl-tetracycline | 0.73 |
| N-(α-hydroxy-β-trichloroethyl)-7-chloro-6-desmethyl-4-epi-tetracycline | 0.22 |
| N-(α-hydroxy-β-trichloroethyl)-anhydrotetracycline | 0.95 |
| N-(α-hydroxy-β-tribromoethyl)-tetracycline | 0.52 |
| N-(α-hydroxy-β-tribromoethyl)-4-epitetracycline | 0.36 |
| N-(α-hydroxy-β-trifluoroethyl)-tetracycline | 0.22 |
| N-(α-hydroxy-β-trifluoroethyl)-5-hydroxy-tetracycline | 0.33 |

Technique: Round filter paper chromatography.
Paper: Schleicher & Schüll 2043b Mgl
Mixture of solvents: toluene:pyridine (20.3 vol.)
Buffer substance: Mc.Ilvain, pH=3.5.

The following examples serve to illustrate the invention but they are not intended to limit it thereto.

EXAMPLE 1

*Triethylamine Salt of N-(α-Hydroxy-β-Trichloroethyl)-Tetracycline (Chloral-Tetracycline-Triethylamine Salt)*

44 grams (0.10 mol) of anhydrous tetracycline are dissolved at a temperature of +20° C. in 440 cc. of methylene chloride containing 11.11 grams (15.45 cc.; 0.11 mol) of triethylamine. To the clear solution there are then added 43.75 grams (29 cc.; 0.3 mol) of recently distilled chloral. After standing of the solution for 3 hours the conversion amounts to 97%. The condensation product is obtained by stirring the reaction mixture into 4400 cc. of anhydrous diethyl ether. The yellow precipitate is separated, washed with ether and dried at +45° C. under reduced pressure.

The N-(α-hydroxy-β-trichloroethyl)-tetracycline-triethylamine salt is a solid yellow substance which decomposes at a temperature above 155–157° C. Solubility in water at +20° C.: 10–15 mg./cc. Yield: 59.0 grams (85% of the theoretical yield). The yield may be increased by working up the mother liquor.

*Analysis.*—$C_{30}H_{40}Cl_3N_3O_9$ (molecular weight=693.1)
Calculated: C=51.99%; H=5.82%; Cl=15.35%; N=6.06%. Found: C=51.71%; H=5.88%; Cl=15.22%; N=5.92%.

*N-(α-Hydroxy-β-Trichloroethyl)-Tetracycline
(Chloral Tetracycline)*

The N-(α-hydroxy-β-trichloroethyl)-tetracycline (chloral tetracycline) obtained in practically quantitative yield by stirring at room temperature 10 grams of the triethylamine salt (vide above) into 150 cc. of 0.1 N-aqueous hydrochloric acid is separated off, washed until free from acid and dried at 50° C. under reduced pressure.

The yellow substance decomposes above 190° C.
*Analysis.*—$C_{24}H_{25}Cl_3N_2O_9$ (molecular weight 591.83).

Calculated: C=48.70%; H=4.26%; Cl=17.97%; N=4.74%: Found: C=48.86%; H=4.39%; Cl=17.71%; N=4.72%.

EXAMPLE 2

*Ammonium Salt of N-(α-Hydroxy-β-Trichloroethyl)-4-Epitetracycline (Ammonium Salt of Chloral-4-Epitetracycline)*

4.6 grams (0.01 mol) of the ammonium salt of 4-epitetracycline are dissolved in 23 cc. of dimethyl-sulfoxide and 2.9 cc. (0.03 mol) of chloral are added. The reaction mixture is maintained for 2½ hours at +35° C. and then introduced into 300 cc. of methylene chloride. The yellow precipitate is separated off, washed by means of methylene chloride and dried at 45° C. under reduced pressure. The desired reaction product decomposes above 210–212° C.

Yield: 5.7 grams (95% of the theoretical yield).

Analysis. — $C_{24}H_{28}Cl_3N_3O_9$ (molecular weight = 608.86). Calculated: C=47.34%; H=4.64%; Cl=17.47%; N=6.90%. Found: C=47.16%; H=4.73%; Cl=17.33%; N=6.77%.

EXAMPLE 3

*N-(α-Hydroxy-β-Trichloroethyl)-7-Chloro-Tetracycline (Chloral-7-Chloro-Tetracycline)*

1.5 cc. (0.015 mol) of chloral are added at +10° C. to 2.4 grams (0.005 mol) of 7-chloro-tetracycline dissolved in 12 cc. of pure pyridine and the mixture is kept at this temperature for about 8 hours. After this period the reaction is terminated as shown by chromatographic examination. By adding the reaction mixture to 200 cc. of ether a light-yellow precipitate is obtained. It is isolated in the usual manner and dried. The solid yellow substance has no defined melting point. It decomposes, while slowly becoming dark, above 200° C.

Yield: 2.8 grams (90% of the theory) of N-(α-hydroxy-β-trichloroethyl)-7-chloro-tetracycline.

Analysis. — $C_{24}H_{24}Cl_4N_2O_9$ (molecular weight = 626.28). Calculated: C=46.03%; H=3.86%; Cl=22.65%; N=4.47%. Found: C=45.87%; H=3.99%; Cl=22.39%; N=4.41%.

EXAMPLE 4

*N - (α-Hydroxy-β-Trichloroethyl)-7-Chloro-4-Epitetracycline (Chloral-7-Chloro-4-Epitetracycline*

This compound is prepared in a manner analogous to that described in Example 3. As regards the definition by paper chromatography, see Table 1.

EXAMPLE 5

*Piperidine Salt of N-(α-Hydroxy-β-Trichloroethyl)-5-Hydroxy-Tetracycline (Piperidine Salt of Chloral-5-Hydroxy-Tetracycline)*

To a clear solution of 4.6 grams (0.01 mol) of 5-hydroxy-tetracycline in 23 cc. of dimethyl-formamide there are added 1.3 cc. (0.01 mol) of anhydrous piperidine and 2.9 cc. (0.03 mol) of chloral. After a reaction period of 5 hours at +25° C. the condensation product is isolated by precipitation with ether and subsequent filtration. The piperidine salt of N-(α-hydroxy-β-trichloroethyl)-5-hydroxy-tetracycline dried at +45° C. under reduced pressure, decomposes at 144° C.

Yield: 6.1 grams (88% of the theory).

Analysis. — $C_{29}H_{36}Cl_3N_3O_{10}$ (molecular weight = 692.97). Calculated: C=50.26%; H=5.24%; Cl=15.35%; N=6.06%. Found: C=50.10%; H=5.33%; Cl=15.09%; N=6.11%.

EXAMPLE 6

*N - (α-Hydroxy-β-Trichloroethyl)-7-Chloro-6-Desmethyl-Tetracycline (Chloral - 7 - Chloro-6-Desmethyl-Tetracycline)*

2.3 grams (0.005 mol) of 7-chloro-6-desmethyl-tetracycline and 1.5 cc. (0.015 mol) of chloral are dissolved in 12 cc. of pyridine. After a reaction period of 8½ hours at +25° C. the condensation product is obtained by introducing the solution into 200 cc. of ether. The light-yellow precipitate is separated off, washed with ether and made into a suspension in 35 cc. of 0.1 N-aqueous hydrochloric acid, in order to eliminate small amounts of non-reacted starting material. The pure condensation product is then separated off, washed until free from acid and dried under reduced pressure at 45° C. The solid, light-yellow substance is easily soluble in 0.1 N-sodium hydroxide solution. It easily suffers change of coloration at 155° C.

Yield: 2.7 grams (87% of the theory).

Analysis.—$C_{23}H_{22}Cl_4N_2O_9$ (molecular weight 612.25). Calculated: C=45.12%; H=3.62%; Cl=23.16%; N=4.58%. Found: C=45.03%; H=3.67%; Cl=23.01%; N=4.66%.

EXAMPLE 7

*N - (α-Hydroxy-β-Trichloroethyl)-7-Chloro-6-Desmethyl-4 - Epitetracycline (Chloral-7-Chloro-6-Desmethyl-4-Epitetracycline)*

The condensation product of the epimeric compound of 7-chloro-6-desmethyl-tetracycline can likewise be obtained according to Example 6. As regards paper chromatography, refer to Table 1.

EXAMPLE 8

*N-Butylamine Salt of N-(α-Hydroxy-β-Trichlroroethyl)-Anhydrotetracycline (n-Butylamine Salt of Chloral-Anhydro-Tetracycline)*

4.3 grams (0.01 mol) of anhydrotetracycline and 1.3 cc. (0.01 mol) of n-butylamine are dissolved in 21.5 cc. of tetrahydrofurane. To the clear solution 2.9 cc. (0.03 mol) of chloral are added at +25° C.

After 6 hours the condensation product is precipitated by introducing the solution into 250 cc. of n-hexane. The solid, light-yellow substance is isolated in the usual manner, washed and dried. The n-butyl salt of N-(α-hydroxy-β-trichloroethyl)- anhydrotetracycline decomposes above 150° C.

Yield: 5.9 grams (91% of the theory).

Analysis. — $C_{28}H_{34}Cl_3N_3O_8$ (molecular weight = 646.95). Calculated: C=51.98%; H=5.30%; Cl=16.44%; N=6.49%. Found: C=51.72%; H=5.53%; Cl=16.73%; N=6.24%.

EXAMPLE 9

*N-(α-Hydroxy-β-Tribromo ethyl)-Tetracycline (Bromal-Tetracycline)*

To a clear solution of 2.2 grams (0.005 mol) of tetracycline in 11 cc. of pyridine there is added at +20° C., 0.84 cc. (0.01 mol) of recently distilled bromal. After a reaction period of 3–4 hours 75 cc. of methylene chloride are added to the reaction mixture and the solution is dropped, while stirring into 200 cc. of ether. The precipitate is collected, washed with ether and dried at 45° C. under reduced pressure. The condensation product changes coloration above 142° C.

Yield: 3.3 grams (93% of the theory).

Analysis. — $C_{24}H_{25}BR_3N_2O_9$ (molecular weight = 725.20). Calculated: C=39.75%; H=3.47%; Br=33.06%; N=3.86%. Found: C=39.57%; H=3.39%; Br=33.22%; N=4.00%.

EXAMPLE 10

*N-(α-Hydroxy-β-Tribromo Ethyl)-4-Epitetracycline (Bromal-4-Epitetracycline)*

This compound is obtained by a method analogous to that described in Example 9. It differs from the compound described in Example 9 by the $R_F$-value of its paper chromatogram.

EXAMPLE 11

*Triethylamine Salt of N-(α-Hydroxy-β-Trifluoroethyl)-Tetracycline (Fluoral-Tetracycline-Triethylamine Salt)*

A clear solution of 4.4 grams (0.01 mol) of tetracycline and 1.82 cc. (0.013 mol.) of triethylamine in 44 cc. of methylene chloride is cooled to −30° C. and 3.0 grams (0.03 mol) of pure fluoral, boiling at −20° C., are added. While stirring, the reaction mixture is heated within 30 minutes to +20° C. and allowed to stand for 6 hours. The mixture is then dropped, while stirring, into 440 cc. of n-hexane and the precipitate obtained is isolated. It is washed by means of n-hexane and dried at 40° C. under reduced pressure.

The triethylamine salt of N-(α-hydroxy-β-trifluoroethyl)-tetracycline decomposes above 108° C.

Yield: 5.9 grams (92% of the theory).

Analysis.—$C_{30}H_{40}F_3N_3O_9$ (molecular weight=643.64). Calculated: C=55.98%; H=6.26%; F=8.86%; N=6.53%. Found: C=56.23%; H=6.37%; F=8.69%; N=6.81%.

EXAMPLE 12

*N-(α-Hydroxy-β-Trifluoroethyl)-5-Hydroxy-Tetracycline (Fluoral-5-Hydroxy-Tetracycline)*

2.3 grams (0.005 mol) of 5-hydroxy-tetracycline are added to a solution of 0.91 cc. (0.015 mol) of triethylamine in a mixture of 23 cc. of methylene chloride and 25 cc. of dimethyl formamide. The solution is cooled to −30° C. and 1.5 grams (0.015 mol) of fluoral having a boiling point of −20° C. is introduced in gaseous form. A precipitate that forms, disappears if the reaction mixture is heated within 30 minutes to +20° C. After 6 hours the mixture is shaken out twice with 450 cc. of n-hexane each time. The oily residue obtained is separated off and freed from adhering solvent at room temperature under reduced pressure. When introducing the mixture into 40 cc. of 0.1 N-hydrochloric acid, the pure N-(α-hydroxy-β-trifluoroethyl)-5-hydroxy-tetracycline is separated off in the form of a light-grey precipitate. It is washed until free from acid and dried at 45° C. under reduced pressure. The condensation product decomposes above 157° C.

Yield: 2.3 grams (83% of the theory).

Analysis.—$C_{24}H_{25}F_3N_2O_{10}$ (molecular weight=558.46). Calculated: C=51.61%; H=4.51%; F=10.21%; N=5.02%. Found: C=51.77%; H=4.70%; F=10.09%; N=5.08%.

We claim:

1. Compounds selected from the group consisting of N-(2-hydroxy-β-trichloroethyl)-, N-(2-hydroxy-β-tribromoethyl)- and N-(2-hydroxy-β-trifluoroethyl)- derivatives of tetracycline, 7-chlorotetracycline, 5-hydroxy-tetracycline, 7-chloro-6-desmethyl-tetracycline, the 4-epi isomers of said compounds, the anhydro derivatives of said compounds, and the triethylamine, ammonium, piperidine and n-butylamino salts thereof.

2. N-(α-hydroxy-β-trichloroethyl)-tetracycline.
3. N-(α-hydroxy-β-trichloroethyl)-7-chloro-tetracycline.
4. N-(α-hydroxy-β-trichloroethyl)5-hydroxy-tetracycline.
5. N-(α-hydroxy-β-trichloroethyl)-7-chloro-6-desmethyl-tetracycline.
6. N-(α-hydroxy-β-trichloroethyl)-7-chloro-6-desmethyl-4-epi-tetracycline.
7. N-(α-hydroxy-β-trichloroethyl)-anhydro-tetracycline.
8. N-(α-hydroxy-β-tribromoethyl)-tetracycline.
9. N-(α-hydroxy-β-trifluoroethyl)-tetracycline.
10. N-(α-hydroxy-β-trifluoroethyl)-5-hydroxy-tetracycline.

References Cited in the file of this patent

UNITED STATES PATENTS

| | | |
|---|---|---|
| 2,832,718 | Weidenheimer et al. | Apr. 29, 1958 |
| 2,875,247 | Fox et al. | Feb. 24, 1959 |
| 2,886,595 | Heinemann et al. | May 12, 1959 |
| 2,907,693 | Price et al. | Oct. 6, 1959 |
| 2,929,711 | Stokstad et al. | Mar. 22, 1960 |
| 2,962,378 | Huhtanen et al. | Nov. 29, 1960 |